March 26, 1940.  H. JAGGER  2,194,553

DUPLICATING MACHINE

Filed Jan. 11, 1939  7 Sheets-Sheet 1

Inventor:
Hubert Jagger,
By:
Zabel, Carlson, Fitzbaugh & Wells
Attorneys

March 26, 1940.   H. JAGGER   2,194,553
DUPLICATING MACHINE
Filed Jan. 11, 1939   7 Sheets-Sheet 2

Inventor:
Hubert Jagger,
By: Zabel, Carlson, Fitzbaugh & Wells
Attorneys

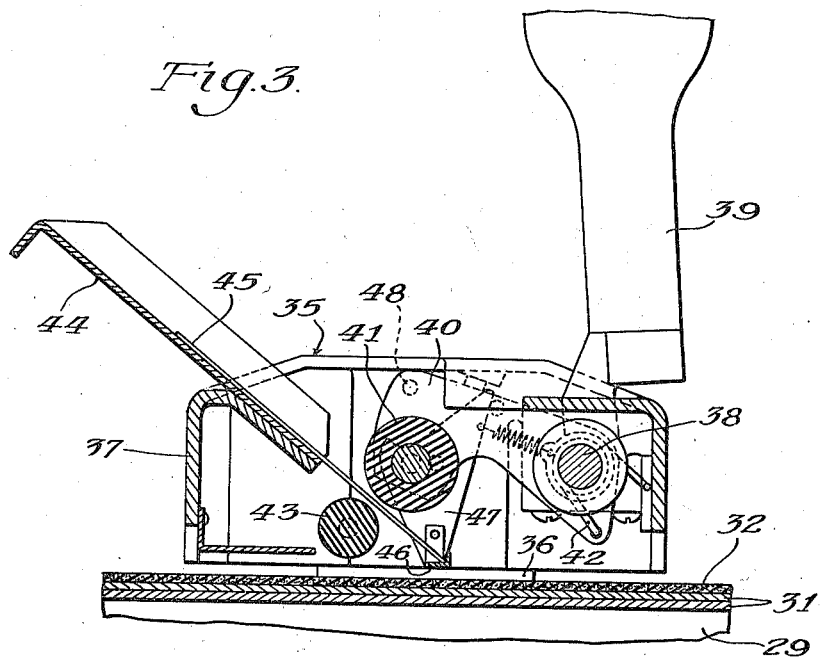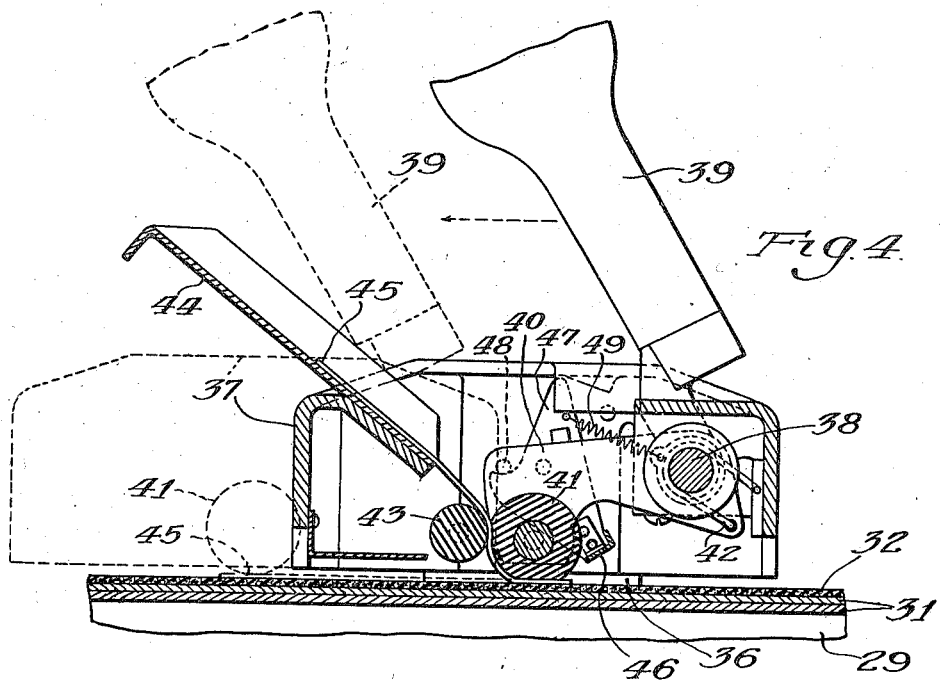

March 26, 1940.　　　　H. JAGGER　　　　2,194,553
DUPLICATING MACHINE
Filed Jan. 11, 1939　　　　7 Sheets-Sheet 4
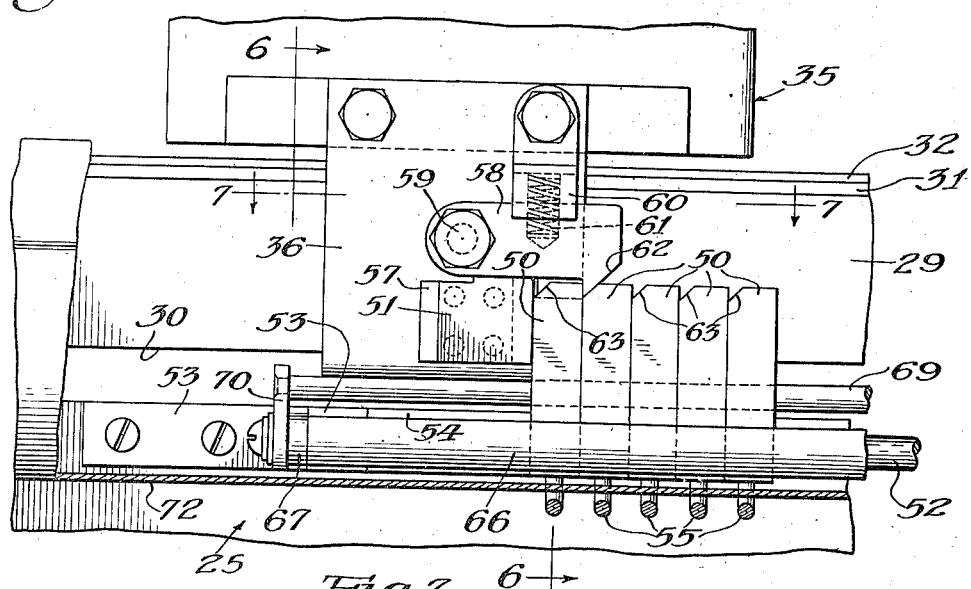
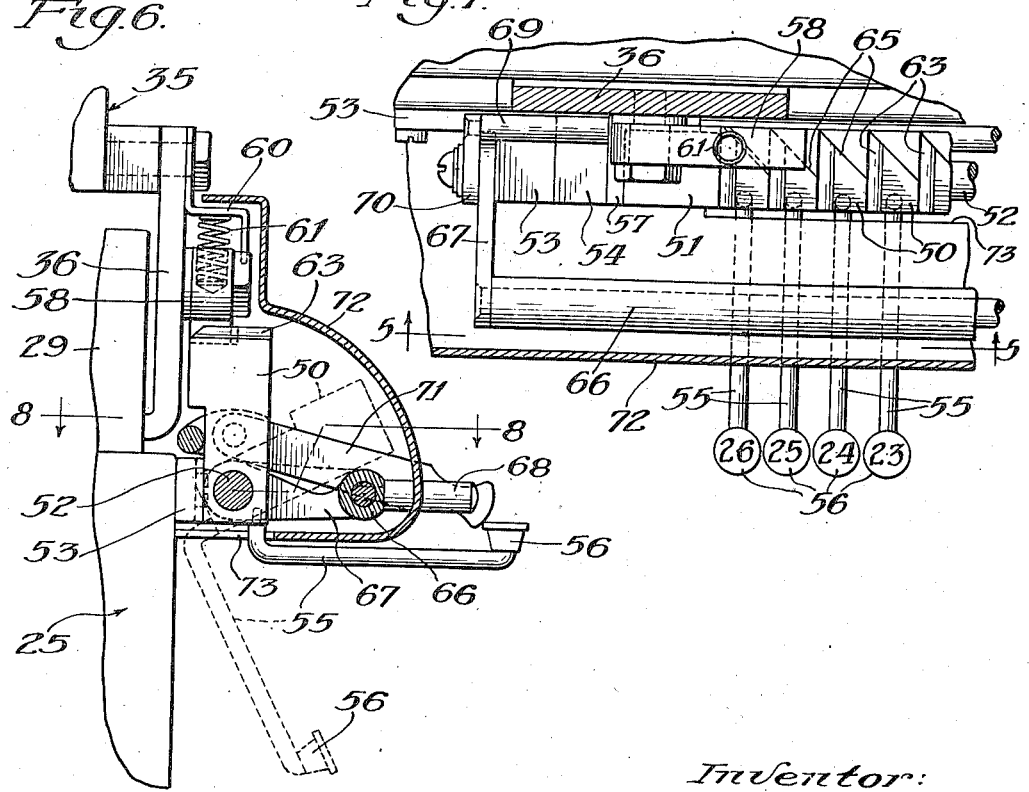
Inventor:
Hubert Jagger
By Zabel, Carlson, Fitzbaugh & Wells
Attorneys March 26, 1940. H. JAGGER 2,194,553
DUPLICATING MACHINE
Filed Jan. 11, 1939 7 Sheets-Sheet 5
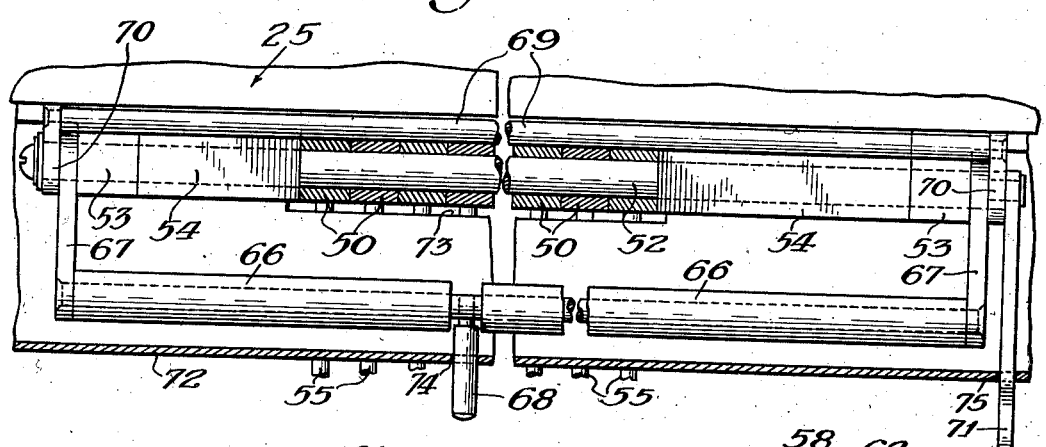
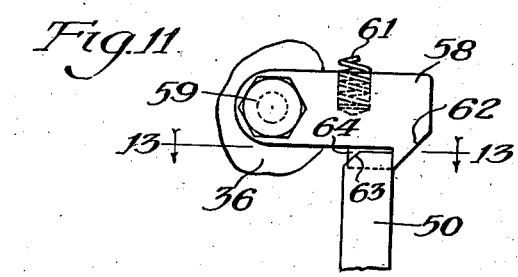
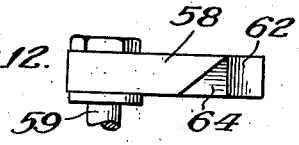
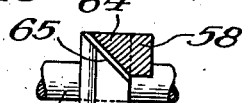
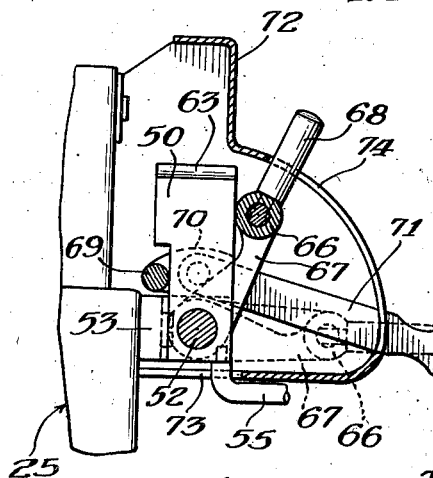
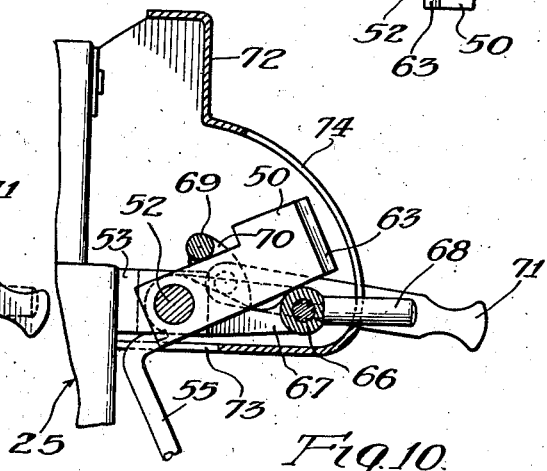
Inventor:
Hubert Jagger
By: Zabel, Carlson, Gilbaugh & Wells
Attorneys.

March 26, 1940.   H. JAGGER   2,194,553
DUPLICATING MACHINE
Filed Jan. 11, 1939   7 Sheets-Sheet 6
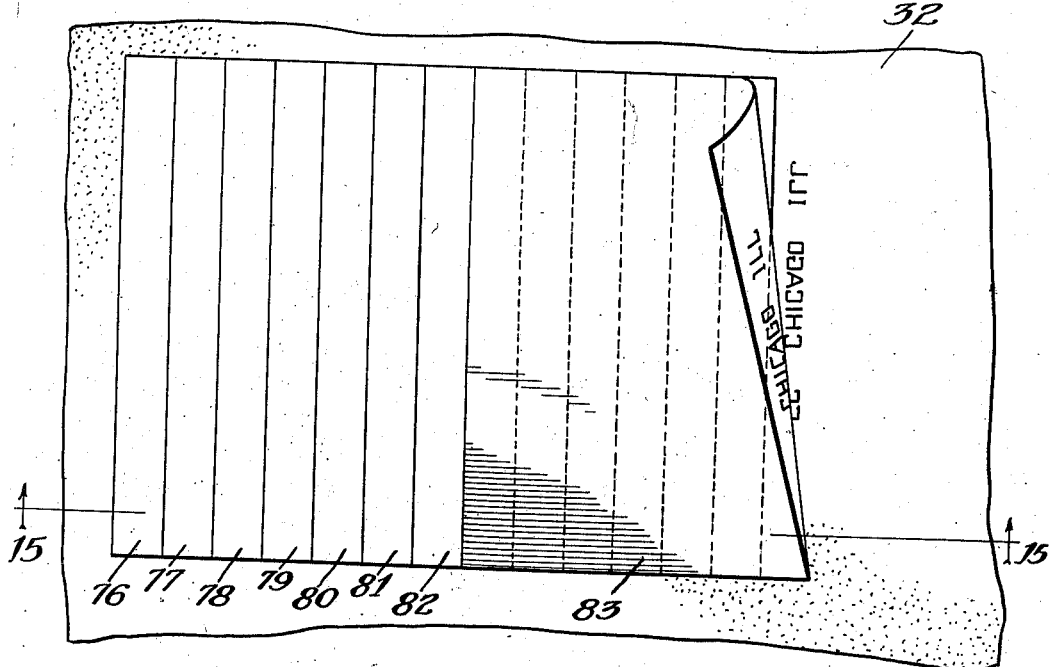
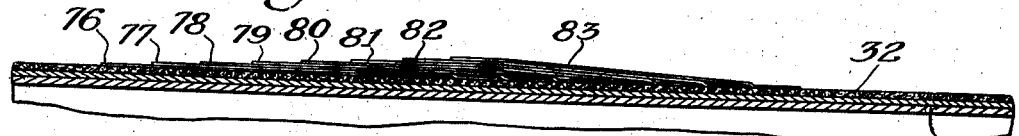
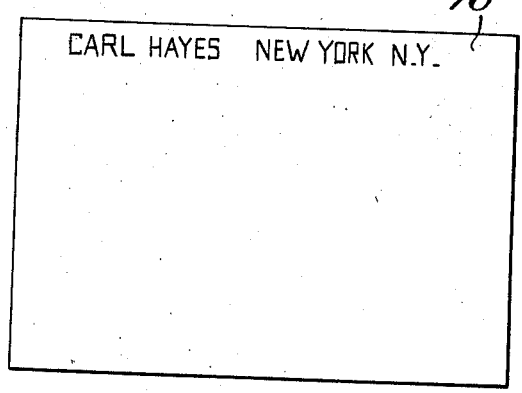
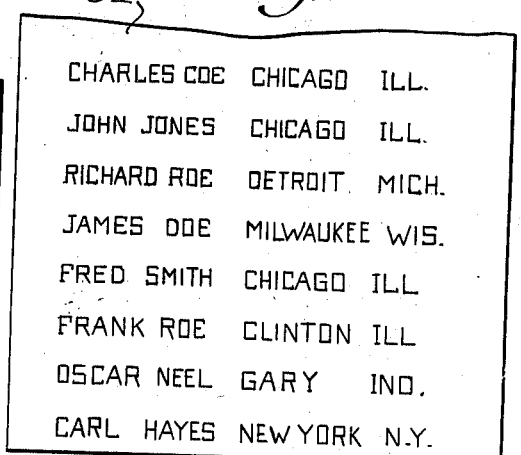
Inventor:
Hubert Jagger
By Zabel, Carlson, Fitzhugh & Wells
Attorney.

March 26, 1940.                H. JAGGER                    2,194,553
                            DUPLICATING MACHINE
                            Filed Jan. 11, 1939            7 Sheets-Sheet 7
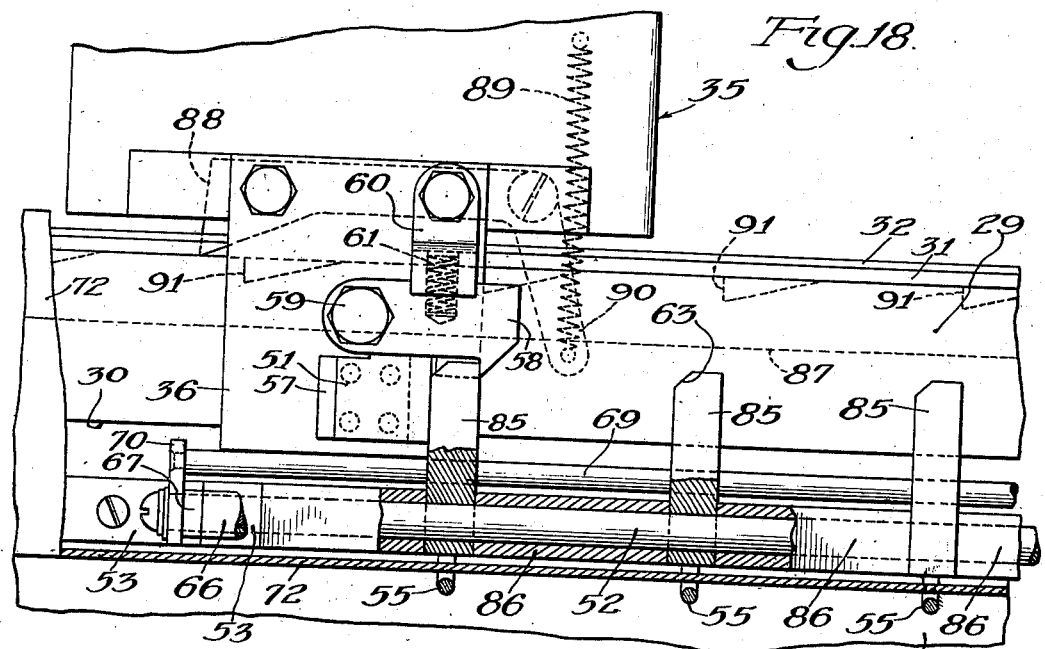
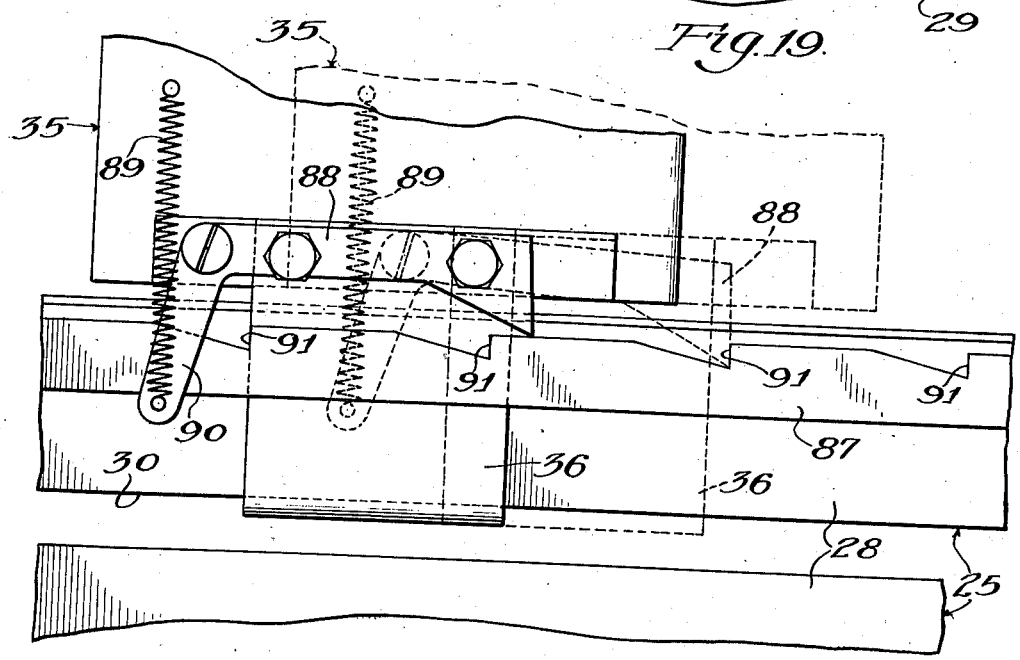
Inventor:
Hubert Jagger Patented Mar. 26, 194

2,194,553

UNITED STATES PATENT OFFICE 2,194,553

DUPLICATING MACHINE

Hubert Jagger, Chicago, Ill., assignor to Ditto, Incorporated, Chicago, Ill., a corporation of West Virginia Application January 11, 1939, Serial No. 250,280

17 Claims. (Cl. 101—133)

My invention relates to duplicating machines of the type employing hectograph duplicating pads in connection with which a master sheet or sheets are employed printed in positive form so as to provide a reverse copy when transferred to the pad. It is the principal object of my invention to provide a new and improved form and arrangement of parts by which the carriage of such a machine may be given a step by step movement both for applying the master copy to the pad from small master sheets and for pressing copy sheets or cards into printing relation to the pad at the desired line or lines of the subject matter on the pad.

For accomplishing my objects, I have provided a plurality of stop blocks pivotally mounted in position and arranged so that the blocks may be employed one at a time for stopping the carriage at spaced intervals for the preparatory operation of applying the copy to the gelatin pad from the small master sheets or for stopping the carriage at correspondingly spaced intervals when copies are being taken from the pad. In the arrangement shown, the various stop blocks are operative when in upright position, being movable sidewise about a horizontal axis into inoperative position. The machine as illustrated is provided with means effective upon a short backward movement of the carriage after a stopping operation to move out of operative position the block by which the stoppage of the carriage was effected so as to leave the parts in such position that the next succeeding forwardly positioned block shall be effective for stopping the carriage in the desired operative position upon the next forward movement of the carriage.

Means is also provided in my improved machine for moving the stop blocks in unison into either their upright operative positions or their lowered inoperative positions. This means is so arranged that upon an operative movement of one part all of the stop blocks which are in lowered position are raised to their upright operative position and that upon an operative movement of another part all of the stop blocks which are in upright operative position are swung downwardly into their lowered inoperative position. The stop blocks in my improved machine are also provided with individually acting indicating and operating means whereby any selected block may be moved readily from the operative position to the inoperative position and whereby the machine shows at a glance which block will normally be effective upon the next succeeding forward movement of the carriage. The arrangement is such that, when one or more of the stop blocks are moved out of operative position prior to the start of a run of copy sheets or cards, the operation with the reduced number of blocks for effecting a reduced number of stops is carried out in the same manner as would have been done if the whole set of blocks had remained in use.

My invention comprises also an alternative arrangement by which stop blocks are provided for stopping the carriage in position for printing a plurality of lines of copy from the pad in lieu of the single line copying. When the single line arrangement is used, the printing operation is effected while the carriage is held in stationary position, but when a plural line spacing is employed it is necessary that the carriage be given a limited movement with respect to the pad for moving the platen roller therealong for bringing about the printing operation. My invention provides means for controlling and limiting the movement of the carriage for effecting such plural line printing.

It is another object of my invention to improve machines of this type in sundry details hereinafter pointed out. The preferred means by which I have accomplished my several objects are illustrated in the accompanying drawings, in which—

Fig. 3 is a vertical sectional view taken substantially at the line 3—3 of Fig. 2;

Fig. 4 is a view similar to Fig. 3 but showing a changed position of the parts and showing diagrammatically by dotted lines a second changed position;

Fig. 5 is an enlarged detailed view corresponding substantially to a portion of the showing of Fig. 1, being a vertical sectional view taken at the line 5—5 of Fig. 7;

Fig. 6 is a vertical sectional view taken substantially at the line 6—6 of Fig. 5 with the housing member in position at the side of the machine;

Fig. 7 is a horizontal sectional view taken substantially at the line 7—7 of Fig. 5;

Fig. 8 is a horizontal sectional view taken substantially at the line 8—8 of Fig. 6 but with certain of the parts omitted;

Figs. 9 and 10 are similar to Fig. 6 with certain of the parts omitted and showing changed positions of the parts;

Fig. 11 is a detailed view similar to a portion of Fig. 5;

Fig. 12 is a bottom face view of the operating dog shown in Fig. 11;

Fig. 13 is a horizontal sectional view taken substantially at the line 13—13 of Fig. 11;

Fig. 14 is a top plan view of a portion of the gelatin band or pad with a plurality of small master sheets in cooperative relation thereto;

Fig. 15 is a vertical sectional view taken substantially at the line 15—15 of Fig. 14;

Fig. 16 is a face view of one of the small master sheets as shown in Figs. 13 and 14;

Fig. 17 is a face view of a copy sheet upon which the data has been imprinted from the gelatin pad without the use of the step by step movement means of the machine;

Fig. 18 is a view similar to that of Fig. 5 but showing a modified form of construction for applying small master sheets, each of which bears a plurality of lines of data; and Fig. 19 is a view of the parts shown in Fig. 18 but from the opposite side of the machine.

Figure 1:
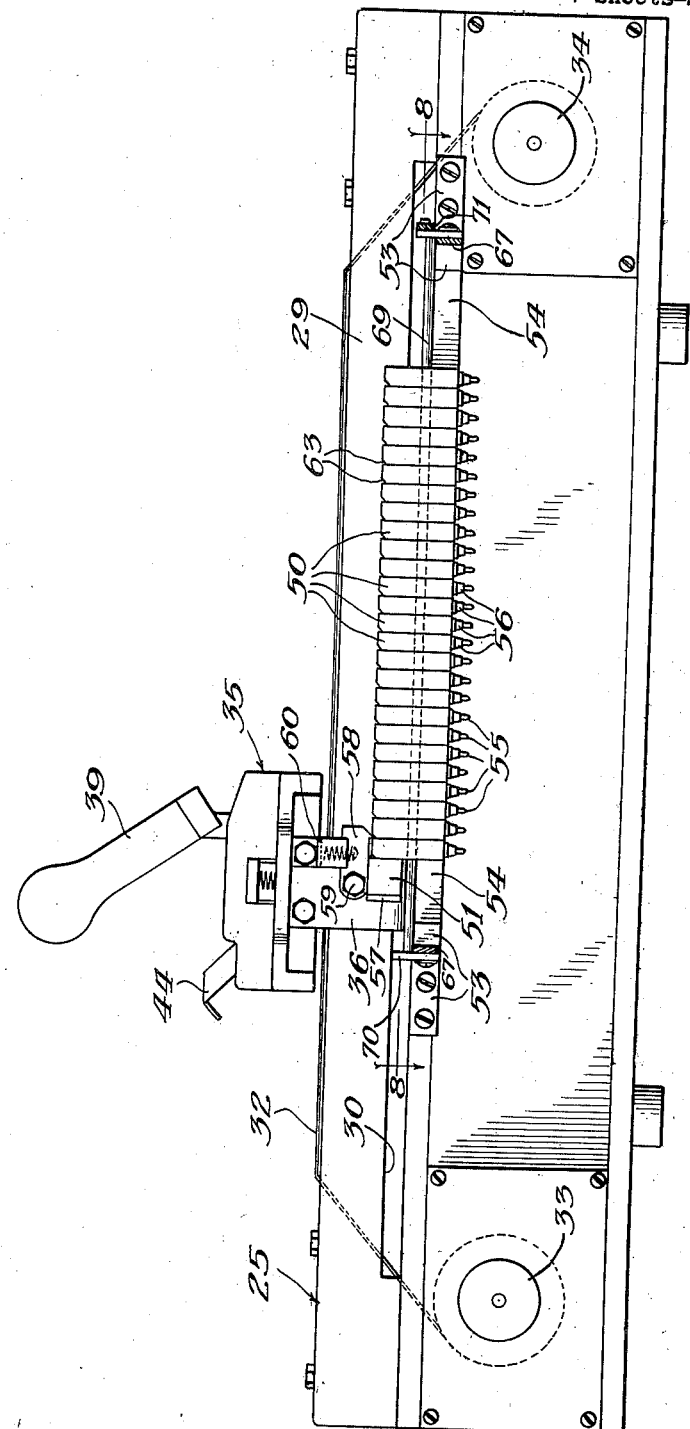
Fig. 1 is a side view of the improved machine forming the subject matter of this application, with a housing member broken away at the side of the machine.
Figure 2:
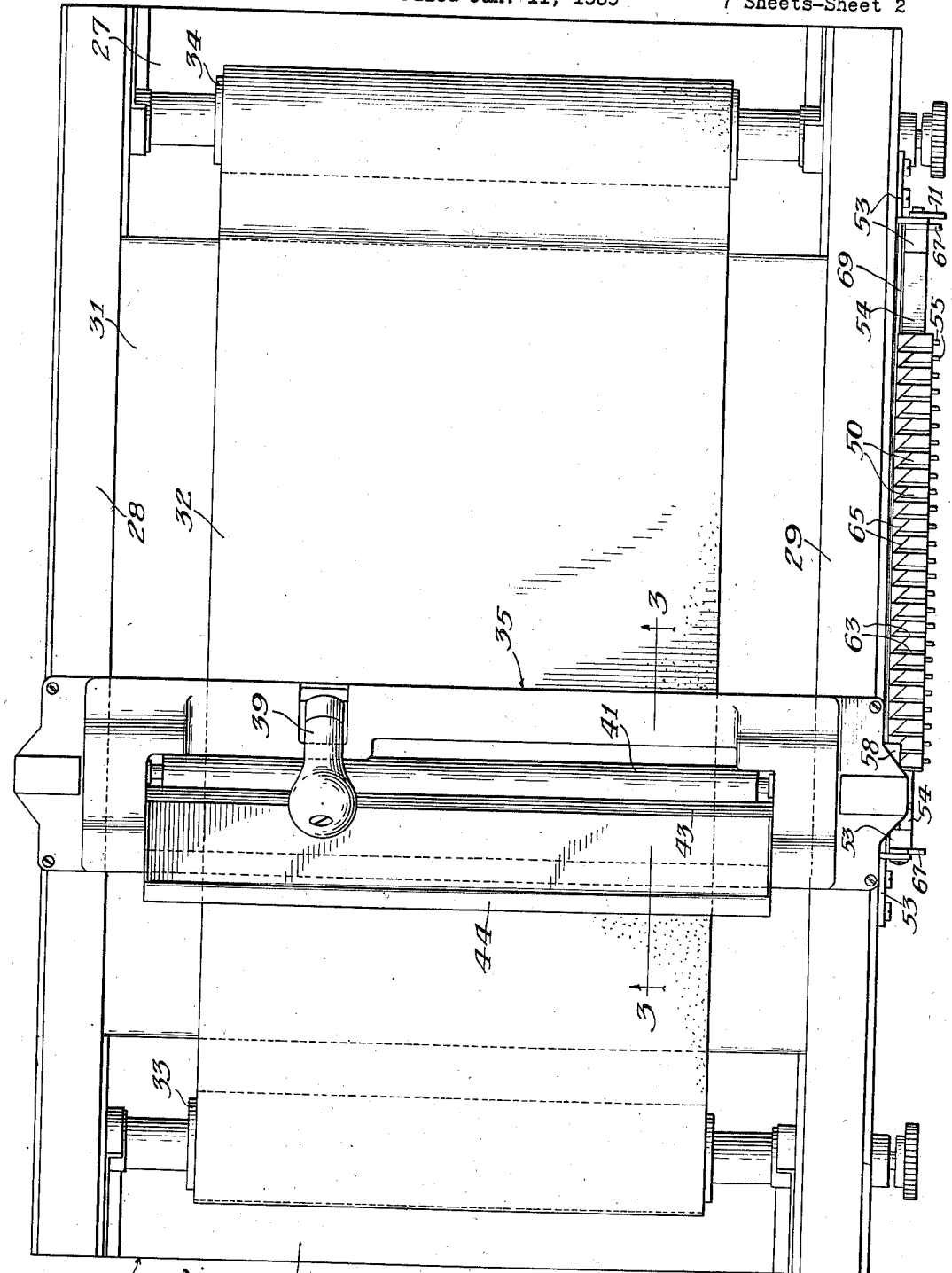
Fig. 2 is a top plan view of the machine of Fig. 1.

Referring now to the several figures of the drawings, in which corresponding parts are indicated by the same reference characters, 25 indicates a base member in the form of a rectangular frame comprising end bars 26 and 27 connected rigidly together by means of side bars 28 and 29. In the arrangement shown, the side bars 28 and 29 are fabricated of a plurality of parts so as to provide a longitudinally extending slot 30 in each of the bars, as is clearly shown in Fig. 1, the arrangement preferably being the same as that shown by United States Letters Patent No. 2,130,962 of September 20, 1938. Between the upper portions of the side bars, I have provided a bed plate 31 of any suitable type, over which a duplicating pad 32 in the form of a band is slidably mounted, the opposite end portions of the band being wound about suitable rollers 33 and 34 journaled transversely of the base member as is best shown in Fig. 2.

Upon the base member 25, I have provided a carriage 35 of any approved type, such carriage comprising preferably a heavy crossbar 36 bent into the form of a wide U and having a framework 37 in the form of a housing of sheet metal fixedly mounted upon the crossbar. The carriage 35 is slidable back and forth upon the base member, being preferably mounted in position by the same means as are shown and described by said Letters Patent above mentioned.

The mechanism carried by the carriage 35 is very similar to that disclosed by said prior patent, comprising a cross-shaft 38 journaled between the end walls of the housing 37, such shaft having a handle or lever 39 affixed thereto for giving it the desired rocking movement. At opposite ends of the carriage, heavy arms 40 are provided in the form of plates fixedly mounted upon the shaft 38, a platen roller 41 being journaled in the rear end portions of said arms. Coiled springs 42 are provided in connection with the plates 40 serving normally to hold the plates in their raised position as shown in Fig. 3, with the handle 39 at the forward limit of its movement.

A cooperating roller 43 is journaled between the end walls of the housing 37 in position to have pressure applied thereon by the roller 41 when moved downwardly. Above the rollers 41 and 43, a guide plate 44 is provided serving as a chute for slidably supporting a piece of sheet material such as the card 45 as shown in Figs. 3 and 4. A margin bar 46 is mounted in position in substantial alignment with the chute 44, such margin bar 46 being movably mounted in position by means of plates 47 which are pivotally mounted upon the end walls of the housing 37. The arms 40 are provided with pins 48 in position to engage the plates 47 for moving the plates 47 in counter-clockwise direction in Figs. 3 and 4 when the arms 40 are given an operative downward stroke. Springs 49 normally urge the said plates 47 in clockwise direction in said Figs. 3 and 4 so as to hold the margin bar 46 normally in the position illustrated in Fig. 3.

The arrangement is such that when the lever or handle 39 is swung backwardly, or toward the left in Figs. 3 and 4, the platen roller 41 is moved downwardly into engagement with the card or other sheet 45 in position upon the support 44 so as to press the forward edge portion of said card or sheet downwardly against the duplicating pad 32, the roller 43 being so positioned as to press the sheet firmly against the rear face of the platen 41 during the downward movement of the platen roller. Upon a reverse movement of the handle 39 for moving the platen roller 41 upwardly, the rollers 41 and 43 cooperate for drawing the card or sheet loose from the duplicating pad 32.

For bringing about the desired step by step movement of the carriage 35, back and forth along the duplicating pad 32, I have provided a series of stop devices 50 movably mounted upon the base member 25 in position to engage a cooperating stop device 51 mounted upon the carriage 35. In the arrangement shown, the stop devices 50 are in the form of blocks pivotally mounted upon a rod 52 mounted at its ends in brackets 53 projecting from a suitable portion of the base member 25. In the arrangement shown, the blocks 50 stand normally in face to face engagement with each other, spacing blocks 54 being provided at the ends of the bar 52 for holding the blocks in the desired position longitudinally of the base member. The arrangement is such that any one or more of the blocks 50 can be tilted sidewise into lowered position as shown in dotted lines in Fig. 6, each of the blocks being provided with a handle or lever 55 extending transversely of the machine therefrom for effecting such tilting movement of the blocks as desired. As is best shown in Fig. 7, each of the handles or levers 55 is provided on its outer end with a numbered head 56. In the arrangement shown, there are twenty-six of the blocks 50, and the heads 56 connected with said blocks are numbered from 1 to 26 in order.

In the construction illustrated, the stop device 51 mounted upon the carriage 35 is in the form of a block of rubber held in position by means of a bracket 57, such block of rubber 51 being positioned horizontally opposite the upper end portions of the stop blocks 50 when in their upright operative position. When the carriage 35 is moved forwardly, or toward the right in Fig. 5, the block 51 is brought into face to face engagement with the stop block 50 farthest toward the left in said Fig. 5, unless such block has been theretofore moved downwardly to its inoperative position.

In my improved machine, the stop blocks 50 are designed to be effective successively for stopping the forward movement of the carriage at different points upon successive forward movements of the carriage. The arrangement in my improved machine is such that the block 50 by which the forward movement of the carriage is stopped is upon the next succeeding backward movement of the carriage moved out of operative position so as to leave the next block 50 to the right in Fig. 1 in position to operate upon a following forward movement of the carriage. For attaining this result, I have provided a pivotally mounted arm 58 extending forwardly at one side of the carriage 35, being pivotally mounted at its rear end portion upon a screw-threaded pin or lug 59 (see Fig. 5). Above the arm 58, I have provided a bracket 60, as is best shown in Fig. 6, a coiled spring 61 being interposed between the bracket and the arm 58 serving normally to hold the arm in its lowered position as shown in Fig. 5, resting upon the stop block 51. As is best shown in Fig. 5, the forward end portion of the arm 58 is beveled at 62, and the rear face portions of the blocks 50 are reversely beveled at 63, with the result that when the carriage is given a forward movement toward the right in Fig. 5, said arm 58 is given an upward swinging movement by a camming action against the action of the spring 61. The arrangement is such that when the stop block 51 of the carriage is brought into engagement with one of the stop blocks 50 of the base member, the arm 58 moves downwardly into engagement with the block 50, such arm 58 being provided with a downwardly extending lug 64 for effecting this result. As is best shown in Fig. 13, the lug 64 is beveled at one side, the adjacent rear face portion of the block 50 being reversely beveled at 65 for cooperative action. As will be readily appreciated, when the carriage 35 is given a backward movement toward the left in Fig. 5 after being stopped by one of the blocks 50, such block 50 is displaced sidewise by the arm 58 by a camming action of the lug 64 upon the block, such block 50 being moved downwardly into substantially the position as shown in Fig. 10.

The arrangement is such in my improved machine that each of the blocks 50 is effective in turn for stopping the carriage, the block effective at any particular forward movement of the carriage being displaced sidewise upon the next succeeding backward movement of the carriage. One or more of the blocks 50 may however be preliminarily displaced by the action of one of the levers 55 if desired so as to have the next adjacent block at the right effective in lieu of the displaced block. Whenever the carriage is stopped by any one of the blocks 50, the numeral upon the head 56 carried by the arm or lever 55 of the block effective for stopping the carriage indicates the position at which the carriage is stopped. Whenever it is desired for any reason to have the carriage in its forward movement skip one of the normal stops, this can be done by displacing the block 50 which normally would act for stopping the carriage at the point in question, the numeral on the head 56 serving to indicate the block to be displaced.

It is sometimes desirable that the blocks in displaced position be moved quickly into upright operative position. For effecting this result, I have provided a bar 66 swingingly mounted upon arms 67 which are pivotally mounted at their inner ends upon the shaft 52. An outwardly extending handle 68 is provided upon the bar 66 at an intermediate point therealong, as is clearly shown in Fig. 8. The bar 66 is normally located in position for the blocks 50 to rest directly thereon in their lowered position as is clearly shown in Figs. 6 and 10. Whenever it is desired that all of the blocks 50 be moved to their upright positions, this can be brought about by an upward movement of the bar 66 upon the arms 67 through the medium of the handle 68.

Means is also provided for quickly lowering all of the blocks 50 standing in upright operative position. The means for effecting this result comprises a crossbar 69 mounted upon arms 70 pivotally mounted upon the shaft 52, one of the arms 70 having a link 71 pivotally connected therewith and extending forwardly into position to be grasped by the operator for drawing the bar 69 toward one side so as to apply pressure upon the blocks 50 for moving them from their upright position to their lowered position.

In the arrangement shown, I have provided a housing member 72 about the blocks 50 and their cooperating parts. Such housing 72 is provided with a longitudinally extending opening 73 at its lower face within which the arms or levers 55 work, with a slot 74 through which the handle 68 extends, and with a slot 75 for the link 71, as is indicated in Fig. 8.

For use with the machine as above described, a plurality of cards, such as the card 76 shown in Fig. 16, are provided, each bearing a single line of data printed or otherwise applied to the card with hectograph ink. In the arrangement shown, the line of data is arranged at substantially the upper edge of the card. With the carriage 35 in position as shown in Figs. 1 and 2, and with the parts in the normal position as shown in Fig. 3, a card 76 is to be placed in position upon the support 44 so as to engage the margin stop bar 46, the card being arranged with the printed matter on its lower face and with its top edge displaced downwardly. The arm or handle 39 is then moved from its upright position as shown in Fig. 3 to the position as shown in Fig. 4 for carrying the platen roller 41 downwardly so as to press the edge portion of the card 76 into operative engagement with the gelatin band 32 for printing in reverse upon the gelatin the data carried by the card 76. The carriage is then given a movement toward the left in Fig. 4 into the position as indicated by dotted lines in said figure for causing the roller 41 to press the card throughout substantially its full extent into engagement with the band 32 for clearing the card from the support 44 and the roller 43. Promptly at the start of the movement of the carriage toward the left, the stop block 50 engaged by the arm 58 is displaced sidewise as above described. After the card has been applied to the gelatin as described, the arm or handle 39 is returned to its upright position and the carriage is moved toward the right in said Fig. 4 until it is stopped by the next succeeding stop block 50 in forwardly spaced relation to the point of stoppage in connection with the initial operation. A second card 77 is then placed in the position occupied by the card 45 in Fig. 3, such card 77 being provided with a different set of data from that carried by the card 76. As is clearly shown in Fig. 15, the upper edge portion of the card 77 is pressed against the gelatin band 32 for the desired transfer of the data thereon to the gelatin band, the remaining portion of the card being laid flat upon the top face of the card 76. In like manner, cards 78, 79, 80, 81, 82 and 83 are applied, each having its individual data thereon. As many additional cards as may be desired are pressed against the gelatin band 32 up to the limit for which the machine is arranged, each of the cards being held in position by its engagement along its upper edge portion with the gelatin band.

After the complete quota of cards have been applied, the cards are stripped manually from the band, leaving the data from the several cards reversely printed upon the gelatin band as indicated in Fig. 14. The thickness of the cards in Fig. 15 is greatly exaggerated for clearness of illustration. It will be understood that the aggregate thickness of the several overlapped cards is not great enough to interfere seriously with the operation of the machine, the printing operation being effected in any event at the point where there is a single ply of the paper upon the gelatin band.

After the small master sheets 76, etc., have been stripped from the gelatin band 32, the machine is ready for the production of duplicated copies. If desired, a card or sheet 84 may be placed in position underneath the carriage 35 upon the full length of the gelatin band 32, being positioned manually for covering the data upon the band. The entire set of blocks 50 having been displaced downwardly and toward the right as shown in Fig. 10 by the use of the link 71, the carriage is moved into position such that the platen roller 41 when moved downwardly will engage one end portion of the sheet 84, whereupon the carriage is moved lengthwise of the bed for causing the platen roller 41 to traverse the full length of the card or sheet 84 for producing thereon all of the data carried by the gelatin band as shown in Fig. 17. After one or more copies of the complete set of data have been made as described, the data of each single line may be copied upon small cards as desired. If it should be desired to make a copy of the complete set of data upon twenty-six cards, printing one line upon each of the several cards, the blocks 50 would be moved to their upright position as shown in Fig. 9, with the carriage 35 at the left of the machine as shown in Fig. 1. A card would then be placed in position upon the support 44 corresponding to the position of the card 45 as shown in Fig. 3, and the carriage would be moved toward the right until stopped by the stop block 50 farthest toward the rear. The handle 39 would then be moved to the position as shown in Fig. 4 for pressing the card against the gelatin band, after which the handle 39 would be brought back to its upright position as shown in Fig. 3, such movement of the lever 39 serving to release the card from the gelatin band. The card would then be removed and a new card placed in the position occupied by the card 45 in Fig. 3, and the carriage would be moved toward the left for displacing the stop block 50 which had just previously been effective for stopping the forward movement of the carriage, whereupon the carriage would be moved again toward the right until stopped by the second one of the stop blocks 50. This procedure would be followed successively with the several cards until the full twenty-six had been printed. It will be understood of course that a considerable number of sets of such cards could be printed if desired.

If additional copies of any one or more of the cards should be required in addition to the complete sets of cards, the blocks 50 would first be displaced to their lowered position, after which the block 50 corresponding to the particular line desired to be printed would be raised and the printing operation would be repeated for such single line in the same way as has been described above.

It sometimes is desired to operate substantially in accordance with the plan above described except that a plurality of lines shall be printed rather than a single line. In any case where this procedure should be desired, the machine as above described could be used by a proper selection and manipulation of the stop blocks 50. For example, if master cards 76 should be employed having two lines of copy thereon, each alternate stop block 50 would be employed in connection with the application of the master sheets to the gelatin band as shown in Figs. 14 and 15. When it was desired thereafter to copy the data from the gelatin band upon a set of blank cards, it would be necessary that care be taken for restricting the operative printing movement of the carriage backwardly from the stop position in order to be sure that the desired data was printed and that no additional data was included in the printing operation.

For permitting the machine to be used to greater advantage in connection with the use of small master cards having a plurality of lines of data thereon, I have provided a modified form of arrangement as shown in Figs. 18 and 19. In this arrangement, a plurality of stop blocks 85 are employed mounted upon the shaft 52 in spaced relation to each other, the spacing being effected by means of blocks 86 interposed between the blocks 85 as clearly shown in Fig. 18. The provision of stop blocks 85 in the desired spaced relation as shown in Fig. 18, obviates the necessity for manual selection of blocks to be employed as above described. The construction of the parts cooperating with the blocks 85 in the arrangement in Fig. 18 corresponds with that described in connection with Figs. 1 to 17 except for the change as above specified.

At the opposite side of the machine from that at which the blocks 85 are mounted, I have provided means for limiting the backward movement of the carriage 35 from each of the several forward movement stop positions as controlled by the blocks 85. This means comprises a rack bar 87 mounted in position upon the base member 25, together with a dog 88 pivotally mounted upon the carriage 35 immediately above the rack bar. As is clearly shown in Fig. 18, the dog 88 is in the form of a bellcrank lever, a coiled spring 89 being connected with the downwardly extending arm 90 of the dog for holding the dog normally in its lowered operative position as shown in changed position by dotted lines in Fig. 19. The rack bar 87 is provided with shoulders 91 in spaced relation therealong corresponding to the spacing of the stop blocks 85, the dog and rack bar being so positioned with respect to each other that the end of the dog is positioned a short distance toward the rear with respect to one of the shoulders 91 at a normal forward movement stop position of the carriage.

In the use of the machine as shown in Figs. 18 and 19, a plurality of small master cards each carrying a plurality of lines of data are mounted upon the gelatin band 32 in the same manner as was described above in connection with the cards 76 to 83, except that the carriage is moved backwardly in each instance with the platen roller 41 in its lowered operative position for pressing the several master cards throughout their full length firmly upon the gelatin band for the desired transfer of the hectograph ink to the band. For this operation, the dog 88 is preferably held out of operative position so as to permit unlimited backward movement of the carriage. The dog 88 is free to swing upwardly about its pivot against the action of the spring 89, and the arrangement is such that the spring becomes effective for retaining the dog in raised position as soon as the spring has been carried past the pivot of the dog in the upward swinging movement of the dog. After the master sheets have been pressed into operative position upon the gelatin band and then removed for a duplicating operation, a copy of the complete set of data can be made upon a card corresponding to the card 84 in the same manner as above described. When it is desired to print upon separate cards the data carried by the separate master sheets, this result is attained in the same manner as above described except that the dog 88 is lowered so as to engage the rack bar 87 for limiting the backward movement of the carriage in each instance. It is clear from a study of Fig. 18 that the rack bar 87 and the dog 88 will permit backward movement of the carriage 35 toward the left through a distance slightly short of the distance between two adjacent shoulders 91 of the rack bar. The arrangement is such that the dog 88 stops the backward movement of the carriage in each instance in time to restrict the copying to a single set of data without danger that any part of the next adjacent set of data shall be copied.

My improved machine is provided primarily for use in connection with pay roll work in cases where the data is applied originally to individual cards rather than to a sheet relating to the work of a considerable number of employees. The machine may however be used for many other purposes and is not restricted in any way to work in connection with pay rolls or other bookkeeping operations.

While I prefer to employ the form and arrangement as shown in the drawings and as above described, it is to be understood that my invention is not limited to such arrangement except so far as the claims may be so limited, since changes might well be made from the form shown without departing from the spirit of my invention.

I claim:

1. In a duplicating machine, the combination of a base member, means for holding a duplicating pad in position on said base member, a carriage member movable back and forth on said base member, a platen mounted on said carriage member and movable thereon toward and from the base member, means for actuating said platen for pressing a sheet into printing relationship with said duplicating pad at a predetermined position on the carriage, stop means carried by one of said members, and a series of stop devices movably mounted on the other of said members and movable selectively into and out of position for cooperation with said first-named stop means so as to enable the stop devices to be set in advance to cause the carriage automatically to skip any of said stops as desired and arranged so that the stop devices in operative position are effective in turn for stopping the carriage at successively different points upon successive forward movements of the carriage.

2. In a duplicating machine, the combination of a base member, means for holding a duplicating pad in position on said base member, a carriage member movable back and forth on said base member, a platen mounted on said carriage member and movable thereon toward and from the base member, means for actuating said platen for pressing a sheet into printing relationship with said duplicating pad at a predetermined position on the carriage, stop means carried by one of said members, a series of stop devices movably mounted on the other of said members and movable selectively independently of each other into and out of cooperative position with respect to said first-named stop means, and means actuated by a rearward movement of the carriage following stoppage by any one of said series of stop devices to move said one stop device out of operative position so as to permit the next successive one of said stop devices in operative position to be effective for stopping the carriage upon the next forward movement of the carriage.

3. In a duplicating machine, the combination of a base member, means for holding a duplicating pad in position on said base member, a carriage member movable back and forth on said base member, a platen mounted on said carriage member and movable thereon toward and from the base member, means for actuating said platen for pressing a sheet into printing relationship with said duplicating pad at a predetermined position on the carriage, stop means carried by one of said members, a series of stop devices movably mounted in aligned position on the other of said members and movable selectively into and out of cooperative position with respect to said first-named stop means, and means serving by a camming action upon rearward movement of the carriage following stoppage of the carriage by one of said stop devices in operative position to move said stop device out of operative position independently of any movement of the remaining stop devices and thus permit the next successive one of said stop devices in operative position to be effective for stopping the carriage upon the next forward movement of the carriage.

4. In a duplicating machine, the combination of a base member, means for holding a duplicating pad in position on said base member, a carriage member movable back and forth on said base member, a platen mounted on said carriage member and movable thereon toward and from the base member, means for actuating said platen for pressing a sheet into printing relationship with said duplicating pad at a predetermined position on the carriage, stop means carried by one of said members, a series of stop devices pivotally mounted on the other of said members on a common axis adapted in operative position to cooperate with said first-named stop means for stopping the forward movement of the carriage and adapted each independently of the others to be swung sidewise out of cooperative position with respect to said first-named stop means, and means automatically actuated by a movement of the carriage following stoppage of the carriage by one of said pivotally mounted stop devices to cause said just previously effective stop device to swing sidewise out of operative position.

5. In a duplicating machine, the combination of a base member, means for holding a duplicating pad in position on said base member, a carriage member movable back and forth on said base member, a platen mounted on said carriage member and movable thereon toward and from the base member, means for actuating said platen for pressing a sheet into printing relationship with said duplicating pad at a predetermined position on the carriage, stop means carried by one of said members, a series of stop devices pivotally mounted on the other of said members adapted in operative position to cooperate with said first-named stop means for stopping the forward movement of the carriage and adapted to be swung sidewise out of cooperative position with respect to said first-named stop means, and an arm yieldingly mounted adjacent to said first-named stop means adapted upon the stoppage of the carriage by any one of said stop devices to assume a position for engagement with said stop device for moving it by a camming action out of operative position upon a succeeding backward movement of the carriage.

6. In a duplicating machine, the combination of a base member, means for holding a duplicating pad in position on said base member, a carriage member movable back and forth on said base member, a platen mounted on said carriage member and movable thereon toward and from the base member, means for actuating said platen for pressing a sheet into printing relationship with said duplicating pad at a predetermined position on the carriage, stop means carried by one of said members, a series of stop devices pivotally mounted on the other of said members adapted in upright position to cooperate with said first-named stop means for stopping the forward movement of the carriage and adapted to be swung sidewise out of cooperative position with respect to said first-named stop means, and an arm pivotally mounted on a transversely positioned axis adjacent to said first-named stop means in position to engage said stop devices, said arm and said stop devices being so shaped that the arm is displaced by a camming action for engagement with the first-named stop device upon a forward movement of the carriage and that the stop device is urged sidewise by a camming action out of operative position upon a subsequent rearward movement of the carriage.

7. In a duplicating machine, the combination of a base member, means for holding a duplicating pad in position on said base member, a carriage member movable back and forth on said base member, a platen mounted on said carriage member and movable thereon toward and from the base member, means for actuating said platen for pressing a sheet into printing relationship with said duplicating pad at a predetermined position on the carriage, stop means mounted on said carriage, a series of stop devices pivotally mounted on said base member adapted in upright position to cooperate with said first-named stop means for stopping the forward movement of the carriage and adapted to be swung sidewise out of cooperative position with respect to said first-named stop means, an arm pivotally mounted on a transversely positioned axis on said carriage in position to engage said stop devices, and yielding means normally urging said arm downwardly, said arm and said stop devices having cooperative beveled face portions adapted upon a forward movement of the carriage to cause said arm to rise by a camming action for engagement with the first contacted stop device and having other cooperative beveled face portions adapted upon a subsequent backward movement of the carriage to move said engaged stop devices sidewise by a camming action out of operative position.

8. In a duplicating machine, the combination of a base member, means for holding a duplicating pad in position on said base member, a carriage member movable back and forth on said base member, a platen mounted on said carriage member and movable thereon toward and from the base member, means for actuating said platen for pressing a sheet into printing relationship with said duplicating pad at a predetermined position on the carriage, stop means carried by one of said members, a series of stop devices movably mounted on the other of said members and movable selectively into and out of position for cooperation with said first-named stop means and arranged so that the stop devices in operative position are effective in turn for stopping the carriage at successively different points upon successive forward movements of the carriage, and manually operable means adapted by an operative stroke to move into inoperative position all of said stop devices standing in operative position.

9. In a duplicating machine, the combination of a base member, means for holding a duplicating pad in position on said base member, a carriage member movable back and forth on said base member, a platen mounted on said carriage member and movable thereon toward and from the base member, means for actuating said platen for pressing a sheet into printing relationship with said duplicating pad at a predetermined position on the carriage, stop means carried by one of said members, a series of stop devices movably mounted on the other of said members and movable selectively into and out of position for cooperation with said first-named stop means and arranged so that the stop devices in operative position are effective in turn for stopping the carriage at successively different points upon successive forward movements of the carriage, and manually operable means adapted by an operative stroke to move into operative position all of said stop devices standing in inoperative position.

10. In a duplicating machine, the combination of a base member, means for holding a duplicating pad in position on said base member, a carriage member movable back and forth on said base member, a platen mounted on said carriage member and movable thereon toward and from the base member, means for actuating said platen for pressing a sheet into printing relationship with said duplicating pad at a predetermined position on the carriage, stop means carried by one of said members, a series of stop devices movably mounted on the other of said members and movable selectively into and out of position for cooperation with said first-named stop means and arranged so that the stop devices in operative position are effective in turn for stopping the carriage at successively different points upon successive forward movements of the carriage, manually operable means for each of said stop devices for moving it out of operative position, and other manually operable means adapted by an operative stroke to move into inoperative position all of said stop devices standing in operative position.

11. In a duplicating machine, the combination of a base member, means for holding a duplicating pad in position on said base member, a carriage member movable back and forth on said base member, a platen mounted on said carriage member and movable thereon toward and from the base member, means for actuating said platen for pressing a sheet into printing relationship with said duplicating pad at a predetermined position on the carriage, stop means carried by one of said members, a series of stop devices movably mounted on the other of said members and movable selectively into and out of position for cooperation with said first-named stop means and arranged so that the stop devices in operative position are effective in turn for stopping the carriage at successively different points upon successive forward movements of the carriage, manually operable means for each of said stop devices for moving it out of operative position, other manually operable means adapted by an operative stroke to move into inoperative position all of said stop devices standing in operative position, and other manually operable means adapted by an operative stroke to move into operative position all of said stop devices standing in inoperative position.

12. In a duplicating machine, the combination of a base member, means for holding a duplicating pad in position on said base member, a carriage member movable back and forth on said base member, a platen mounted on said carriage member and movable thereon toward and from the base member, means for actuating said platen for pressing a sheet into printing relationship with said duplicating pad at a predetermined position on the carriage, a rod mounted on said base member at one side thereof, a plurality of stop blocks pivotally mounted on said rod so as to be capable of swinging from an upright operative position to a lowered inoperative position, and stop means mounted on said carriage at a point above said rod for stopping the forward movement of the carriage by engagement with the rear face of one of said stop blocks when in upright operative position.

13. In a duplicating machine, the combination of a base member, means for holding a duplicating pad in position on said base member, a carriage member movable back and forth on said base member, a platen mounted on said carriage member and movable thereon toward and from the base member, means for actuating said platen for pressing a sheet into printing relationship with said duplicating pad at a predetermined position on the carriage, a rod mounted on said base member at one side thereof, a plurality of stop blocks pivotally mounted on said rod so as to be capable of swinging from an upright operative position to a lowered inoperative position, stop means mounted on said carriage at a point above said rod for stopping the forward movement of the carriage by engagement with the rear face of one of said stop blocks when in upright operative position, and means actuated by the backward movement of the carriage following stoppage of one of said blocks for moving said block out of upright operative position so as to permit the next adjacent block in upright operative position to be effective for stopping the carriage upon its next succeeding forward movement.

14. In a duplicating machine, the combination of a base member, means for holding a duplicating pad in position on said base member, a carriage member movable back and forth on said base member, a platen mounted on said carriage member and movable thereon toward and from the base member, means for actuating said platen for pressing a sheet into printing relationship with said duplicating pad at a predetermined position on the carriage, a rod mounted on said base member at one side thereof, a plurality of stop blocks pivotally mounted on said rod so as to be capable of swinging from an upright operative position to a lowered inoperative position, stop means mounted on said carriage at a point above said rod for stopping the forward movement of the carriage by engagement with the rear face of one of said stock blocks when in upright operative position, and an arm pivotally mounted on a transversely positioned axis on said carriage in position to engage said blocks in upright operative position, said arm and each of said blocks being correspondingly beveled at their meeting faces for moving the arm upwardly by a camming action for engagement with the block upon a forward movement of the carriage and being correspondingly beveled at their opposite faces for moving the block sidewise by a camming action upon a backward movement of the carriage.

15. In a duplicating machine, the combination of a base member, means for holding a duplicating pad in position on said base member, a carriage member movable back and forth on said base member, a platen mounted on said carriage member and movable thereon toward and from the base member, means for actuating said platen for pressing a copy sheet into printing relationship with said duplicating pad at a predetermined position on the carriage and for holding the platen in printing position while the carriage is given a movement with respect to the base member and the duplicating pad thereon, stop means carried by one of said members, a series of stop devices movably mounted on the other of said members and movable selectively into and out of position for cooperation with said first-named stop means and arranged so that the stop devices in operative position are effective in turn for stopping the carriage at successively different points upon successive forward movements of the carriage, and means effective at the various forward movement stop positions of the carriage as controlled by said stop devices for stopping a backward printing movement of the carriage short of the position at which the carriage would have been stopped on a forward movement by the next adjacent one of said series of stop devices.

16. In a duplicating machine, the combination of a base member, means for holding a duplicating pad in position on said base member, a carriage member movable back and forth on said base member, a platen mounted on said carriage member and movable thereon toward and from the base member, means for actuating said platen for pressing a copy sheet into printing relationship with said duplicating pad at a predetermined position on the carriage and for holding the platen in printing position while the carriage is given a movement with respect to the base member and the duplicating pad thereon, stop means carried by one of said members, a series of stop devices movably mounted on the other of said members and movable selectively into and out of position for cooperation with said first-named stop means and arranged so that the stop devices in operative position are effective in turn for stopping the carriage at successively different points upon successive forward movements of the carriage, a rack bar carried by one of said members, and a yieldingly mounted dog carried by the other member adapted by cooperation with said rack bar at any stop position of the carriage as controlled by said stop devices to stop a backward printing movement of the carriage short of the position at which the carriage would have been stopped by the next adjacent one of said series of stop devices.

17. In a duplicating machine, the combination of a base member, means for holding a duplicating pad in position on said base member, a carriage member movable back and forth on said base member, a platen mounted on said carriage member and movable thereon toward and from the base member, means for actuating said platen for pressing a copy sheet into printing relationship with said duplicating pad at a predetermined position on the carriage and for holding the platen in printing position while the carriage is given a movement with respect to the base member and the duplicating pad thereon, stop means carried by one of said members, a series of stop devices movably mounted on the other of said members and movable selectively into and out of position for cooperation with said first-named stop means and arranged so that the stop devices in operative position are effective in turn for stopping the carriage at successively different points upon successive forward movements of the carriage, a rack bar carried by one of said members, a bellcrank lever pivotally mounted on the other of said members in position to engage said rack bar and adapted by such engagement at any stop position of the carriage as controlled by said stop devices to stop the backward printing movement of the carriage short of the position at which the carriage would have been stopped by the next adjacent one of said series of stop devices, and spring means connected with said bellcrank lever adapted in one position of the lever to urge it into operative relation to said rack bar and adapted in another position of the lever to hold it yieldingly out of operative position.

HUBERT JAGGER.